United States Patent [19]
Saito et al.

[11] Patent Number: 5,747,595
[45] Date of Patent: May 5, 1998

[54] CATALYST FOR THE POLYMERIZATION OF OLEFINES AND PROCESSES FOR THE POLYMERIZATION OF OLEFINES USING THE SAME

[75] Inventors: Toshiya Saito; Takayuki Taki, both of Saitama-ken; Masashi Nakajima, Kanagawa-ken; Kunihiko Imanishi, Saitama-ken; Masahide Murata, Tokyo; Hiroyuki Ozaki; Kazukiyo Aiba, both of Saitama-ken, all of Japan; Masatoshi Ookura, League City, Tex.; Satoshi Ueki, Tokyo, Japan

[73] Assignee: Tonen Corporation, Tokyo, Japan

[21] Appl. No.: 622,751

[22] Filed: Mar. 27, 1996

[30] Foreign Application Priority Data

| Mar. 28, 1995 | [JP] | Japan | 7-093219 |
| Oct. 9, 1995 | [JP] | Japan | 7-286339 |
| Feb. 8, 1996 | [JP] | Japan | 8-045601 |

[51] Int. Cl.$^6$ ............... C08F 4/649; C08F 10/06
[52] U.S. Cl. ............ 525/270; 502/125; 502/108; 526/124.8; 526/125.3; 526/904
[58] Field of Search ............ 502/125; 526/125.3, 526/124.8; 525/270

[56] References Cited

U.S. PATENT DOCUMENTS

| 4,990,478 | 2/1991 | Hoppin et al. | 502/125 |
| 5,100,981 | 3/1992 | Schreck et al. | 526/351 |
| 5,449,738 | 9/1995 | Koura et al. | 525/270 |
| 5,473,021 | 12/1995 | Koura et al. | 525/270 |

FOREIGN PATENT DOCUMENTS

| 385765 | 9/1990 | European Pat. Off. . |
| 446801 | 9/1991 | European Pat. Off. . |
| 531834 | 3/1993 | European Pat. Off. . |
| 54-94590 | 7/1979 | Japan . |
| 55-36203 | 3/1980 | Japan . |
| 57-63310 | 4/1982 | Japan . |
| 58-83016 | 5/1983 | Japan . |
| 58-198503 | 11/1983 | Japan . |
| 61-78803 | 4/1986 | Japan . |
| 62-11705 | 1/1987 | Japan . |
| 62-14904 | 6/1987 | Japan . |
| 63-264607 | 11/1988 | Japan . |
| 5-331233 | 12/1993 | Japan . |

*Primary Examiner*—Edward J. Smith
*Attorney, Agent, or Firm*—Cowan, Liebowitz & Latman, P.C.

[57] ABSTRACT

A catalyst for the polymerization of olefines comprises a solid catalytic component obtained by pre-polymerizing propylene in the presence of (A) a solid component containing magnesium, titanium, halogen and an electron-donating compound, (B) an organoaluminum compound, and (C) an alkylalkoxysilane represented by the formula, $R^1Si(OR^2)(OCH_3)_2$, wherein $R^1$ represents a branched or cyclic alkyl group having 3 to 6 carbon atoms, and $R^2$ represents a branched alkyl, alkenyl or alkinyl group having 3 to 6 carbon atoms; (B) an organoaluminum compound; and (D) an alkyltrialkoxysilane represented by the formula, $R^3Si(OR^4)_2(OCH_3)$, wherein $R^3$ represents a linear alkyl group having 3 to 6 carbon atoms, and $R^4$ represents a branched alkyl, alkenyl or alkinyl group having 3 to 5 carbon atoms.

14 Claims, No Drawings

CATALYST FOR THE POLYMERIZATION OF OLEFINES AND PROCESSES FOR THE POLYMERIZATION OF OLEFINES USING THE SAME

The present invention relates to a catalyst for the polymerization of olefines and processes for the polymerization of olefines using the catalyst.

PRIOR ART

Many catalyst systems comprising a solid catalytic component which contains magnesium, titanium, halogen and an electron-donating compound as essential components were used in polymerization of alpha-olefines, as they are so highly active that a decatalyzing step may be eliminated. It is known that in the polymerization of alpha-olefines by the use of such catalyst systems, stereoregularity of the resulting polymers are enhanced by adding an organic silicon compound which has a Si—O—C bond or is represented by the general formula, $SiR^1R^2_n(OR^3)_{3-n}$, wherein n is from zero to 2, together with an organoaluminum compound to the catalystic system (see, for instance, Japanese Patent Applications Laid-Open Nos. Sho-54-94590; 55-36203; 57-63310; 58-83016; 62-11705; 61-78803; Hei-3-119004 and; Hei-5-331233).

Polypropylenes obtained in such previous technique have surely increased stereoregularity, good rigidity and good heat resistance. However, their melt flow rates (MFR) decrease with the increasing stereoregularity, and their molecular weight distributions tend to be narrower, so that they show poor molding processability. In copolymerization of propylene with ethylene, the amount of components of less stereoregularity is large compared to that in homopolymerization of propylene and, accordingly, the effect of the addition of the silicon compound as one of the catalytic components is sometime insufficient. This is more remarkable in preparing a random copolymer of propylene and ethylene with a broad molecular weight distribution, and accordingly a large amount of components of less stereoregularity often causes stickiness in a drying step in the manufacturing process to badly decrease the production efficiency.

Polypropylenes intrinsically have a drawback of low impact strength. It was tried to improve impact resistance by copolymerizing propylene with other olefines such as ethylene. This surely improves impact resistance, but rigidity decreases at the same time. Therefore, many methods have been proposed to improve balance between rigidity and impact resistance by multi-step polymerization where polypropylene and another olefine are polymerized stepwise at varying polymerization ratio. However, no sufficient method has been found.

SUMMARY OF THE INVENTION

The present invention provides a catalyst for the polymerization of olefines. In other aspect, the present invention provides a process for the polymerization of propylene using the catalyst to produce polypropylene with high stereoregularity, broad molecular weight distribution and a high melt flow rate (MFR).

In a further aspect, the present invention provides a process for the copolymerization of propylene and ethylene using the catalyst to produce a random copolymer with an ethylene content of 0.1 to 6% by weight and with broad molecular weight distribution and a less amount of components of low stereoregularity.

In another aspect, the present invention provides a process for the copolymerization of propylene and ethylene to produce a block copolymer with excellent balance between impact resistance and rigidity and with high flowability.

The present invention is a catalyst for the polymerization of olefines, comprising a solid catalytic component obtained by pre-polymerizing propylene in the presence of (A) a solid component containing magnesium, titanium, halogen and an electron-donating compound, (B) an organoaluminum compound, and (C) an alkylalkoxysilane, characterized in that the catalyst comprises a solid catalytic component obtained by pre-polymerizing propylene in the presence of (A) the solid component, (B) an organoaluminum compound, and (C) an alkyltrialkoxysilane represented by the formula, $R^1Si(OR^2)(OCH_3)_2$, wherein $R^1$ represents a branched or cyclic alkyl group having 3 to 6 carbon atoms, and $R^2$ represents a branched alkyl, alkenyl or alkinyl group having 3 to 6 carbon atoms;

(B) an organoaluminum compound; and (D) an alkyltrialkoxysilane represented by the formula, $R^3Si(OR^4)_2(OCH_3)$, wherein $R^3$ represents a linear alkyl group having 3 to 6 carbon atoms, and $R^4$ represents a branched alkyl, alkenyl or alkinyl group having 3 to 5 carbon atoms.

In a process for the polymerization of propylene, the aforesaid catalyst is used.

In a process for the copolymerization of propylene with ethylene to produce a random copolymer with an ethylene content of 0.1 to 6% by weight, propylene and ethylene are copolymerized in the presence of the aforesaid catalyst.

In a process for the copolymerization of propylene with ethylene to produce a block copolymer, the process comprises steps of (1) polymerizing propylene alone in the presence of the aforesaid catalyst to produce a highly crystalline polypropylene, and (2) copolymerizing propylene and ethylene in the presence the aforesaid catalyst.

PREFERRED EMBODIMENTS OF THE INVENTION (A) Solid Component

The solid component (A) as one of the catalytic components used in the invention contains magnesium, titanium, halogen and an electron-donating component as essential components. Generally, this may be prepared by contacting a magnesium compound, a titanium compound and an electron-donating compound together. When none of these compounds contains halogen, a halogen-containing compound is also brought into contact with these together. Examples of these compounds will be explained below.

(1) Magnesium Compound

The magnesium compound may be represented by the general formula, $MgR^5R^6$, wherein $R^5$ and $R^6$ may be same with or different from each other and represent a hydrocarbon group, preferably, having 1 to 20 carbon atoms, an OR' group (wherein R' is a hydrocarbon group, preferably, having 1 to 12 carbon atoms) or a halogen atom. More specifically, examples of the hydrocarbon group for $R^5$ or $R^6$ are alky, cycloalkyl, aryl and aralkyl groups having 1 to 20 carbon atoms. Examples of R' for the OR' group include alkyl, cycloalkyl, aryl and arakyl groups having 1 to 12 carbon atoms. The halogen atom includes chlorine, bromine, iodeine and fluorine atoms.

Some examples of the compound will be listed below, wherein Me is an abbreviation for methyl; Et, ethyl; Pr, propyl; Bu, butyl; He, hexyl; Oct, octyl; Ph, phenyl; and cyHe, cyclohexyl.

MgMe$_2$, MgEt$_2$, Mgi-Pr$_2$, MgBu$_2$, MgHe$_2$, MgOct$_2$, MgEtBu, MgPh$_2$, MgcyHe$_2$, Mg(OMe)$_2$, Mg(OEt)$_2$, Mg(OBu)$_2$, Mg(OHe)$_2$, Mg(OOct)$_2$, Mg(OPh)$_2$, Mg(OcyHe)$_2$, EtMgCl, BuMgCl, HeMgCl, i-BuMgCl, t-BuMgCl, PhMgCl, PhCH$_2$MgCl, EtMgBr, BuMgBr, PhMgBr, BuMgI, EtOMgCl, BuOMgCl, HeOMgCl, PhOMgCl, EtOMgBr, BuOMgBr, EtOMgI, MgCl$_2$, MgBr$_2$, MgI$_2$.

The aforesaid magnesium compounds can also be prepared from metal magnesium or other magnesium compounds in the preparation of component (A). For instance, metal magnesium, a halogenated hydrocarbon and an alkoxy group-containing compound represented by the general formula, $X_nM(OR)_{m-n}$ are contacted with each other, wherein X represents a hydrogen atom, a halogen atom or a hydrocarbon group having 1 to 20 carbon atoms, M represents a boron, carbon, aluminium, silicon or phosphorus atom, R represents a hydrocarbon group having 1 to 20 carbon atoms, m is a valency of M and $m>n\geq 0$.

Examples of the hydrocarbon group as X or R in the general formula for the aforesaid alkoxyl group-containing compound include alkyl groups such as methyl (Me), ethyl (Et), propyl (Pr), i-propyl (i-Pr), butyl (Bu), i-butyl (i-Bu), hexyl (He), octyl (Oct); cycloalkyl groups such as cyclohexyl (cyHe) and methyl cyclohexyl; alkenyl groups such as allyl, propenyl and butenyl; aryl groups such as phenyl (Ph), tolyl and xylyl; and aralkyl groups such as phenethyl and 3-phenyl propyl. Among those preferred are alkyl groups having 1 to 10 carbon atoms. Some specific examples of the alkoxy group-containing compound will be listed below.

(i) Compounds in the cases where M is a carbon atom:

C(OR)$_4$ such as C(OMe)$_4$, C(OEt)$_4$, C(OPr)$_4$, C(OBu)$_4$, C(Oi-Bu)$_4$, C(OHe)$_4$, C(OOct)$_4$; XC(OR)$_3$ such as HC(OMe)$_3$, HC(OEt)$_3$, HC(OPr)$_3$, HC(OBu)$_3$, HC(OHe)$_3$, HC(OPh)$_3$, MeC(OMe)$_3$, MeC(OEt)$_3$, EtC(OMe)$_3$, EtC(OEt)$_3$, cyHeC(OEt)$_3$, PhC(OMe)$_3$, PhC(OEt)$_3$, CH$_2$ClC(OEt)$_3$, MeCHBrC(OEt)$_3$; MeCHClC(OEt)$_3$; ClC(OMe)$_3$, ClC(OEt)$_3$, ClC(Oi-Bu)$_3$ and BrC(OEt)$_3$; and X$_2$C(OR)$_2$ such as MeCH(OMe)$_2$, MeCH(OEt)$_2$, CH$_2$(OMe)$_2$, CH$_2$(OEt)$_2$, CH$_2$ClCH(OEt)$_2$, CHCl$_2$CH(OEt)$_2$, CCl$_3$CH(OEt)$_2$, CH$_2$BrCH(OEt)$_2$ and PhCH(OEt)$_2$.

(ii) Compounds in the cases where M is a silicon atom:

Si(OR)$_4$ such as Si(OMe)$_4$, Si(OEt)$_4$, Si(OBu)$_4$, Si(Oi-Bu)$_4$, Si(OHe)$_4$, Si(OOct)$_4$ and Si(OPh)$_4$; XSi(OR)$_3$ such as HSi(OEt)$_3$, HSi(OBu)$_3$, HSi(OHe)$_3$, Hsi(OPh)$_3$; MeSi(OMe)$_3$, MeSi(OEt)$_3$, MeSi(OBu)$_3$, EtSi(OEt)$_3$, PhSi(OEt)$_3$, EtSi(OPh)$_3$; ClSi(OMe)$_3$, ClSi(OEt)$_3$, ClSi(OBu)$_3$, ClSi(OPh)$_3$ and BrSi(OEt)$_3$; X$_2$Si(OR)$_2$ such as Me$_2$Si(OMe)$_2$, Me$_2$Si(OEt)$_2$, Et$_2$Si(OEt)$_2$; MeClSi(OEt)$_2$; CHCl$_2$SiH(OEt)$_2$; CCl$_3$SiH(OEt)$_2$; and MeBuSi(OEt)$_2$; and X$_3$SiOR such as Me$_3$SiOMe, Me$_3$SiOEt, Me$_3$SiOBu, Me$_3$SiOPh, Et$_3$SiOEt, and Ph$_3$SiOEt.

(iii) Compounds in the cases where M is a boron atom:

B(OR)$_3$ such as B(OEt)$_3$, B(OBu)$_3$, B(OHe)$_3$ and B(OPh)$_3$.

(iv) Compounds in the cases where M is an aluminium atom:

Al(OR)$_3$ such as Al(OMe)$_3$, Al(OEt)$_3$, Al(OPr)$_3$, Al(Oi-Pr)$_3$, Al(OBu)$_3$, Al(Ot-Bu)$_3$, Al(OHe)$_3$, and Al(OPh)$_3$.

(v) Compounds in the cases where M is a phosphorus atom:

P(OR)$_3$ such as P(OMe)$_3$, P(OEt)$_3$, P(OBu)$_3$, P(OHe)$_3$ and P(OPh)$_3$.

Complexes of the aforesaid magnesium compound with an organic compound of a metal of Group II or IIIa of the periodic table may also be used. Such complexes may be represented by the general formula, MgR$^5$R$^6$.n(MR$^7_m$), wherein M represents the aforesaid metal, such as aluminium, zinc and calcium, R$^7$ represents an alkyl, cycloalkyl, aryl or aralkyl group having 1 to 12 carbon atoms, m represents a valency of the metal, M, and n is a number of from 0.1 to 10. Examples of the compound, MR$^7_m$, include AlMe$_3$, AlEt$_3$, Ali-Bu$_3$, AlPh$_3$, ZnMe$_2$, ZnEt$_2$, ZnBu$_2$, ZnPh$_2$, CaEt$_2$ and CaPh$_2$.

(2) Titanium Compound

The titanium compounds are compounds of divalent, trivalent or tetravalent titanium, such as titanium tetrachloride, titanium tetrabromide, trichloroethoxy titanium, trichlorobutoxy titanium, dichlorodiethoxy titanium, dichlorodibutoxy titanium, dichlorodiphenoxy titanium, chlorotriethoxy titanium, chlorotributoxy titanium, tetrabutoxy titanium, and titanium trichloride. Among these, preferred are halogenized titanium (IV) compounds, such as titanium tetrachloride, trichloroethoxy titanium, dichlorodibutoxy titanium, and dichlorodiphenoxy titanium, particularly titanium tetrachloride.

(3) Electron-Donating Compound

Examples of the electron-donating compounds include carboxylic acids, carboxylic acid anhydrides, carboxylic acid esters, carboxylic acid halogenides, alcohols, ethers, ketones, amines, amides, nitriles, aldehydes, alcoholates, phosphorus bound with organic groups via carbon or oxygen atom, arsenic and antimony compounds, phosphoamides, thioethers, thioesters and carbonic acid esters. Among these, preferred are carboxylic acids, carboxylic acid anhydrides, carboxylic acid esters, carboxylic acid halogenides, alcohols and ethers.

Examples of the carboxylic acids include aliphatic monocarboxylic acids such as formic acid, acetic acid, propionic acid, butyric acid, isobutyric acid, valeric acid, capric acid, pivalic acid, acrylic acid, methacrylic acid and crotonic acid; aliphatic dicarboxylic acids such as malonic acid, succinic acid, glutaric acid, adipic acid, sebacic acid, maleic acid and fumaric acid; aliphatic oxycarboxylic acids such as tartaric acid; alicyclic carboxylic acids such as cyclohexane monocarboxylic acid, cyclohexene monocarobxylic acid, cis-1,2-cyclohexane dicarboxylic acid, and cis-4-methyl cyclohexene-1,2-dicarboxylic acid; aromatic monocarboxylic acids such as benzoic acid, toluic acid, anisic acid, p-tert.-butyl benzoic acid, naphthoic acid and sinnamic acid; and aromatic polycarboxylic acids such as phthalic acid, isophthalic acid, terephthalic acid, naphthalic acid, trimellitic acid, hemimellitic acid, trimesic acid, pyromellitic acid, and mellitic acid.

As the carboxylic acid anhydrides, those of the aforesaid carboxylic acids may be used.

As the carboxylic acid esters, mono- or polyvalent esters of the aforesaid carboxylic acids may be used, such as butyl formate, ethyl actate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, ethyl cyclohexanecarboxylate, methyl benzoate, ethyl benzoate, methyl p-toluate, ethyl p-tert.-butylbenzoate, ethyl p-anisate, ethyl α-naphthoate, isobutyl α-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellitate, tributyl trimellitate, tetramethyl pyromellitate, tetraethyl pyromellitate, and tetrabutyl pyromellitate.

As the carboxylic acid halogenides, acid halogenides of the aforesaid carboxylic acids may be used, such as acetyl chloride, acetyl bromide, acetyl iodide, propionyl chloride, butyroyl chloride, butyroyl bromide, butyroyl iodide, pivaloyl chloride, pivaloyl bromide, acryloyl chloride, acryloyl bromide, acryloyl iodide, methacryloyl chloride, methacryloyl bromide, methacryloyl iodide, crotonyl chloride, malonyl chloride, malonyl bromide, succinyl chloride, succinyl bromide, glutaryl chloride, glutaryl bromide, adipoyl chloride, adipoyl bromide, sebacoyl chloride, sebacoyl bromide, maleyl chloride, maleyl bromide, bumaryl chloride, fumaryl bromide, tartaric acid chloride, tartaric acid bromide, cyclohexane carboxyloyl chloride, cyclohexane carboxyloyl bromide, 1-cyclohexene carboxyloyl chloride, cis-4-methyl cyclohexene carboxyloyl chloride, cis-4-methyl cyclohexene carboxyloyl bromide, benzoyl chloride, benzoyl bromide, p-toluoyl chloride, p-toluoyl bromide, p-anisoyl chloride, p-anisoyl bromide, α-naphthoyl chloride, cinnamoyl chloride, cinnamoyl bromide, phthaloyl dichloride, phthaloyl dibromide, isophthaloyl dichloride, isophthaloyl dibromide, terephthaloyl dichloride, and naphthaloyl dichloride. Monoalkyl halogenide of dicarboxylic acids may also be used, such as monomethyl adipoyl chloride, monoethyl maleoyl chloride, monomethyl maleoyl chloride, and butyl phthaloyl chloride.

The alcohols may be represented by the general formula, $R^8OH$, wherein $R^8$ is an alkyl, alkenyl, cycloalkyl, aryl or aralkyl group having 1 to 12 carbon atoms. Examples of the alcohols include methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethylphenol, isopropylphenol, p-tert.-butylphenol, and n-octylphenol.

The ethers may be represented by the general formula, $R^9OR^{10}$, wherein $R^9$ and $R^{10}$ may be same with or different from each other and be an alkyl, alkenyl, cycloalkyl, aryl or aralkyl group having 1 to 12 carbon atoms. Examples of the ethers include diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisol and ethylphenyl ether.

Component A may be prepared in various manners, such as, for instance, (i) the magnesium compound (component 1), the titanium compound (component 2) and the electron-donating compound (component 3) are combined in this order, (ii) component 1 is contacted with component 3 and, then, with component 2, or (iii) components 1, 2 and 3 are combined at the same time.

In the aforesaid (i), (ii) or (iii), component 2 may be contacted with a halogen-containing compound before brought into contact with component 1 and/or component 3.

Examples the halogen-containing compound include halogenated hydrocarbons, halogen-containing alcohols, halogenated silicon compounds having a hydrogen-silicon bond and halides of the elements of Group IIIa, IVa or Va of the periodic table (hereinafter referred to as metal halides).

Examples of the halogenated hydrocarbons include mono- or polyhalogen-substituted, saturated or unsaturated, aliphatic, alicyclic or aromatic hydrocarbons having 1 to 12 carbon atoms, for instance, aliphatic compounds such as methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propyl chloride, 1,2-dichloropropane, hexachloropropylene, octachloropropane, decabromobutane, and chlorinated paraffins; alicyclic compounds such as chlorocyclopropane, tetrachlorocyclopentane, hexachlorocyclopentadiene, and hexachlorocyclohexane; and aromatic compounds such as chlorobenzene, bromobenzene, o-dichlorobenzene, p-dichlorobenzene, hexachlorobenzene, hexabromobenzene, benzotrichloride and p-chlorobenzotrichloride. One or more of these compounds may be used.

The halogen-containing alcohol is a mono- or polyvalent alcohol having one or more hydroxyl groups in a molecule in which any one or more hydrogen atoms which are not in the hydroxyl gorups are substituted by halogen atoms, such as chlorine, bromine, iodine and fluorine atoms, preferably chlorine atom.

This includes 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propanediol, 2-chlorocyclohexanol, 4-chlorobenzyhydrol, (m,o,p)-chlorobenzylalcohol, 4-chlorocatechol, 4-chloro-(m,o)-cresol, 6-chloro-(m,o)-cresol, 4-chloro-3,5-dimethylphenol, chlorohydroquinone, 2-benzyl-4-chlorophenol, 4-chloro-1-naphthol, (m,o,p)-chlorophenol, p-chloro-α-methylbenzylalcohol, 2-chloro-4-phenylphenol, 6-chlorothymol, 4-chlororesorcinol, 2-bromoethanol, 3-bromo-1-propanol, 1-bromo-2-propanol, 1-bromo-2-butanol, 2-buromo-p-cresol, 1-bromo-2-naphthol, 6-bromo-2-naphthol, (m,o,p)-bromophenol, 4-bromoresorcinol, (m,o,p)-fluorophenol, p-iodophenol; 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol; 2,2,2-trichloroethanol, 1,1,1-trichloro-2-propanol, β,β,β-trichloro-tert.-butanol, 2,3,4-trichlorophenol, 2,4,5-trichlorophenol, 2,4,6-trichlorophenol, 2,4,6-tribromophenol, 2,3,5-tribromo-2-hydroxytoluene, 2,3,5-tribromo-4-hydroxytoluene, 2,2,2-trifluoroethanol, α,α,α-trifluoro-m-cresol, 2,4,6-triiodophenol; 2,3,4,6-tetrachlorophenol, tetrachlorohydroquinone, tetrachlorobisphenol A, tetrabromobisphenol A, 2,2,3,3-tetrafluoro-1-propanol, 2,3,5,6-tetrafluorophenol and tetrafluororesorcinol.

Examples of the halogenated silicon compounds having a hydrogen-silicon bond include $HSiCl_3$, $H_2SiCl_2$, $H_3SiCl$, $H(CH_3)SiCl_2$, $H(C_2H_5)SiCl_2$, $H(t-C_4H_9)SiCl_2$, $H(C_6H_5)SiCl2$, $H(CH_3)_2SiCl$, $H(i-C_3H_7)_2SiCl$, $H_2(C_2H_5)SiCl$, $H_2(n-C_4H_9)SiCl$, $H_2(C_6H_4CH_3)SiCl$, and $H(C_6H_5)_2SiCl$.

Examples of the metal halides include chlorides, fluorides, bromides and iodides of B, Al, Ga, In, Tl, Si, Ge, Sn, Pb, As, Sb and Bi, preferably $BCl_3$, $BBr_3$, $BI_3$, $AlCl_3$, $AlBr_3$, $GaCl_3$, $GaBr_3$, $InCl_3$, $TlCl_3$, $SiCl_4$, $SnCl_4$, $SbCl_5$ and $SbF_5$.

The contact among components 1, 2 and 3 and, if needed, the halogen-containing compound may be conducted by mixing under stirring or mechanical grinding in the presence or absence of an inert medium. The contact may be carried out under heating at a temperature of 40° to 150° C.

Examples of the inert medium include saturated aliphatic hydrocarbons such as hexane, heptane and octane, saturated alicyclic hydrocarbons such as cyclopentane and cycloexane, and aromatic hydrocarbons such as benzene, toluene and xylene.

Preferred methods for the preparation of Component A according to the invention are described in Japanese Patent Applications Laid-Open Nos. Sho-63-264607; 58-198503; and 62-146904. More specifically, (i) a magnesium-containing solid obtained by contacting (a) metal magnesium, (b) a halogenated hydrocarbon and (c) a compound represented by the general formula, $X_nM(OR)_{m-n}$, as defined above for the alkoxy group-containing compound, is brought into contact with (d) a halogen-containing alcohol and, then, with (e) an electron-donating compound and (f) a titanium compound (JP Applications Laid-Open Sho-63-264607), (ii) (a) magnesium dialkoxide is contacted with (b) a halogenated silicon compound having a hydrogen-silicon bond and, then, with (c) a halogenated titanium compound and, subsequently, with (d) an electron-donating compound (and further, if needed, with a halogenated titanium compound) (JP Application Laid-Open Sho-62-146904), or (iii) (a) magnesium dialkoxide is contacted with (b) a halogenated silicon compound having a hydrogen-silicon bond and, then, with (c) an electron-donating compound and, subsequently, with (d) a titanium compound (JP Application Laid-Open Sho-58-198503).

Among those, method (i) is most preferred.

Component A prepared as mentioned above may be washed with the aforesaid inert medium if needed, and may further be dried.

(B) Organoaluminum Compound

The organoaluminum compound (hereinafter referred to as component B) is represented by the general formula, $R^{11}_n AlX_{3-n}$, wherein $R^{11}$ represents an alkyl or aryl group, X represents a halogen atom, an alkoxy group or a hydrogen atom, and n is any number in the range, $1 \leq n \leq 3$. Particularly preferred are alkylaluminium compounds with an alkyl group having 1 to 18 carbon atoms, preferably 2 to 6 carbon atoms, such as trialkylaluminium, dialkylalumnium monohalide, monoalkylaluminium dihalide, alkylaluminium sesquihalide, dialkylaluminium monoalkoxide and dialkylaluminium monohalide, and mixtures or complexes thereof. More specifically, trialkylaluminium such as trimethylaluminium, triethylaluminium, tripropylaluminium, triisopropylaluminium, tributylaluminium, triisobutylaluminium, and trihexylaluminium; dialkylaluminium monohalide such as dimethylaluminium chloride, diethylaluminium chloride, diethylaluminium bromide, diethylaluminium iodide, and isobutylaliminium chloride; monoalkylaluminium dihalide such as methylaluminium dichloride, ethylaluminium dichloride, methylaluminium dibromide, ethylaluminium dibromide, ethylalminium diiodide, and isobutylaluminium dichloride; alkylaluminium sesquihalide such as ethylaluminium sesquichloride; dialkylaluminium monoalkoxide such as dimethylaluminium methoxide, diethylaluminium ethoxide, diethylaluminium phenoxide, dipropylaluminium ethoxide, diisopropylaluminium ethoxide, and diisobutylaluminium phenoxide; and dialkylaluminium halide such as dimethylaluminium halide, diethylaluminium halide, dipropylaluminium halide, and diisobutylaluminium halide. Among these, trialkylaluminium, particularly triethylaluminium and triisobutylaluminium, is preferred.

Particularly, trialkylaluminium may be used together with other organoaluminum compounds such as those commercially available with ease, for instance, diethylaluminium chloride, ethylaluminium dichloride, ethylaluminium sesquichloride, diethylaluminium ethoxide and diethylaluminium halide, and mixtures or complexes thereof.

Aluminium compounds in which two or more aluminium atoms are bound with each other via an oxygen or nitrogen atom may also be used here, such as those shown below:

$(C_2H_5)_2AlOAl(C_2H_5)_2$,

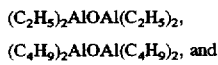

$(C_4H_9)_2AlOAl(C_4H_9)_2$, and

$(C_2H_5)_2AlNAl(C_2H_5)_2$
|
$C_2H_5$ (C) Alkyltrialkoxysilane

Component (C) for the present catalyst is alkylalkoxysilane represented by the general formula, $R^1Si(OR^2)(OCH_3)_2$, wherein $R^1$ represents a branched or cyclic alkyl group having 3 to 6 carbon atoms and $R^2$ represents a branched alkyl, alkenyl or alkinyl group having 3 to 6 carbon atom. $R^1$ may be, for instance, isopropyl, tert.-butyl, sec.-butyl, tert.-amyl, cyclopentyl and cyclohexyl groups. $R^2$ may be, for instance, isopropyl, tert.-butyl, sec.-butyl, t-amyl, 2-methyl-3-butenyl, 3-methyl-2-butenyl and 2-methyl-3-butinyl groups. Particularly named are
tert.-butoxycyclopentyldimethoxysilane,
isopropoxycyclopentyldimethoxysilane,
sec.-butoxycyclopentyldimethoxysilane,
tert.-amyloxycyclpentyldimethoxysilane,
tert.-butoxycyclohexyldimethoxysilane,
isopropoxycyclohexyldimethoxysilane,
sec.-butoxycylohexyldimethoxysilane,
tert.-amyloxycyclohexyldimethoxysilane,
(2-methyl-3-butene-2-oxy) cyclopentyldimethoxysilane,
(3-methyl-2-butene-1-oxy) cyclopentyldimethoxysilane,
(2-methyl-3-butine-2-oxy) cyclopentyldimethoxysilane,
(2-methyl-3-butene-2-oxy) cyclohexyldimethoxysilane,
(3-methyl-2-butene-1-oxy) cyclohexyldimethoxysilane, and
(2-methyl-3-butine-2-oxy) cyclohexyldimethoxysilane.

(D) Alkyltrialkoxysilane

Component (D) for the present catalyst is alkyltrialkoxysilane represented by the general formula, $R^3Si(OR^4)_2(OCH_3)$, wherein $R^3$ represents a linear alkyl group having 3 to 6 carbon atoms and $R^4$ represents a branched alkyl, alkenyl and alkinyl group having 3 to 5 carbon atoms. $R^3$ may be, for instance, n-propyl, n-butyl and n-hexyl groups. $R^4$ may be, for instance, isopropyl, tert.-butyl, sec.-butyl, tert.-amyl, 2-methyl-3-butenyl, 3-methyl-2-butenyl and 2-methyl-3-butinyl groups. Particularly named are diisopropoxymethoxy n-propylsilane, di-sec.-butoxymethoxy n-propylsilane, di-tert.-butoxymethoxy n-propylsilane, di-tert.-amyloxymethoxy n-propylsilane, diisopropoxymethoxy n-butylsilane, di-sec.-butoxymethoxy n-butylsilane, di-tert.-butoxymethoxy n-butylsilane, di-tert.-amyloxymethoxy n-butylsilane, diisopropoxymethoxy n-hexylsilane, di-sec.-butoxymethoxy n-hexylsilane, di-tert.-butoxymethoxy n-hexylsilane, di-tert.-amyloxymethoxy n-hexylsilane, di(2-methyl-3-butene-2-oxy)methoxy n-propylsilane, di(3-methyl-2-butene-1-oxy) methoxy n-propylsilane, di(2-methyl-3-butine-2-oxy) methoxy n-propylsilane, di(2-methyl-3-butene-2-oxy) methoxy n-butylsilane, di(3-methyl-2-butene-1-oxy) methoxy n-butylsilane, and di(2-methyl-3-butine-2-oxy) methoxy n-butylsilane.

Prepolymerization

The prepolymerization is conducted by polymerizing propylene in the presence of the solid component (A), the organic aluminum compound (B) and the alkyltrialkoxysilane (C).

The prepolymerization may be carried out in a liquid phase or a gaseous phase, but preferably in a liquid phase in the presence of the aforesaid inert medium. The prepolymerization is carried out generally at a temperature of 100° C. or below, preferably from −30° C. to +50° C., more preferably from −20° C. to +15° C. Batch manner or continuous manner may be used for the prepolymerization. Multi-stage manner with two or more stages may also be used where polymerization conditions in each stage are different from those in other stages as a matter of course.

Component B is used in an amount to give a concentration of from 10 to 500 millimoles per liter, preferably from 30 to 200 millimoles per liter, in the prepolymerization system and, at the same time, to give a ratio of from 1 to 50,000 moles, preferably 2 to 1,000 moles, per gram atom of titanium contained in component A. Component C is used in an amount to give a concentration of from 1 to 1,000 millimoles per liter, preferably from 2 to 200 millimoles per liter, in the prepolymerization system. Propylene is taken up in component A in the prepolymerization. The amount of the polymerized propylene is preferably controlled to be 0.1 to 200 g, more preferably 0.5 to 50 g, per gram of component A.

The catalytic component thus prepared according to the invention may be diluted or washed with the aforesaid inert medium. It is preferred to wash it from the point of view of preventing the catalytic component from deteriorating in storage. After the washing, it may be dried if needed. When the catalytic component is stored, it is desirably stored at a temperature as low as possible, preferably at −50° C. to +30° C., more preferably at −20° C. to +5° C.

Polymerization or Copolymerization

The aforesaid solid catalytic component obtained from components A, B and C, an organoaluminum compound and the aforesaid alkyltrialkoxysilane (D) are mixed to prepare the catalyst of the invention. The organoaluminum component (B) used at this stage may be selected from those mentioned above in the context of the preparation of the solid catalytic component from components A, B and C, and may or may not be same as a particular species which was used there. The amount of the organoaluminum compound (B) which is added here is preferably 1 to 2,000 gram moles, more preferably 20 to 500 gram moles, per gram atom of titanium contained in the catalytic component.

A ratio of the organoaluminum compound (B) added here to component D is 0.1 to 40 gram atoms, preferably 1 to 25 gram atoms, of aluminium per mole of component D.

Propylene alone or propylene and ethylene are polymerized in the presence of the present catalyst to obtain envisaged homopolymers, random copolymers or block copolymers.

Homopolymerization of propylene and random copolymerization of propylene and ethylene may be carried out in either a gaseous phase or a liquid phase. In liquid phase embodiments (co)polymerization may be carried out in an inert hydrocarbon such as n-butane, isobutane, n-pentane, isopentane, hexane, heptane, octane, cyclohexane, benzene, toluene or xylene, or the liquid monomer. A polymerization temperature may generally be from −80° C. to +150° C., preferably from 40° to 120° C. Polymerization pressure may be, for instance, 1 to 60 atoms. Molecular weight of a polymer to be obtained may be regulated by the presence of hydrogen or other known molecular weight regulators in a reactor.

For the block copolymerization of propylene and ethylene, step (1) to polymerize propylene alone may be conducted as mentioned above. Step (1) may be conducted in two or more different conditions. It is preferred that the polypropylene obtained in step (1) amounts to 50 to 98% by weight, particularly 70 to 95% by weight, of the block copolymer.

Step (2) is also carried out in the presence of the catalyst of the invention. Copolymerization of propylene and ethylene is performed so that an ethylene content in a copolymer obtained in this step is 30 to 95% by weight, preferably 40 to 80% by weight. Copolymerization conditions may be selected from those mentioned above. A molecular weight regulator such as hydrogen amy also be used. Step (2) may also be conducted in two or more different conditions as in step (1).

The amount of the copolymer obtained in step (2) amounts to 50 to 2% by weight, preferably 30 to 5% by weight of the block copolymer.

Step (a) and step (b) may be conducted in this order or reverse order in series. Alternatively, step (a) and step (b) are conducted in parallel and, then, the polymers thus obtained are combined. The order, step (a) and then step (b), is advantageous from the point of view of equipments and is preferred.

The invention will be further explained in reference to the following Examples and Comparative Examples.

EXAMPLES

Percentages below are based on weight, unless otherwise stated.

Melt flow rates (MFR) were determined in accordance with ASTM D-1238.

A heptane-insoluble content (hereinafter referred to as HI) which represents a rate of crystalline polymers in a polymer is a residue in weight percentage after six-hour extraction with boiling n-heptane in a modified Soxhlet extractor.

An ether-soluble content (hereinafter referred to as ES) which represents a rate of low stereoregularity components in a polymer is an amount (% by weight) of a substance which is extracted after six-hour extraction with boiling diethylether in a modified Soxhlet extractor.

Bending modulus and Du Pont impact strength were determined in accordance with the Japanese Industrial Standards (JIS) K-7203 and K-7211, respectively.

Ratio, Mw/Mn (weight average molecular weight/number average molecular weight), which is a measure of molecular weight distribution, was determined in gel permeation chromatograph (GPC)(Waters Co., type 150-C) at a measurement temperature of 135° C., using orthodichlorobenzene as a measurement solvent.

Polymerization of Propylene

Example 1

(a) Preparation of a solid component (A) comprising magnesium, titanium, halogen and an electron-donating compound as essential components.

In a one liter reactor equipped with a reflux condenser placed were 8.3 g of metal magnesium in a form of chip (99.5% pure, average diameter 1.6 mm) and 250 ml of n-hexane in a nitrogen gas atmosphere and stirred at a temperature of 68° C. for 1 hour. Then, metal magnesium was taken out and dried at 65° C. in vacuum to obtain pre-activated metal magnesium.

To this metal magnesium added were 140 ml of n-butyl ether and 0.5 ml of a solution of n-butyl magnesium chloride in n-butyl ether (1.75 moles/liter) to prepare a suspension, to which a solution of 38.5 ml of n-butyl chloride in 50 ml of n-butyl ether was added dropwise at 55° C. over 50 minutes. Stirring was continued at 70° C. for 4 hours to proceed with reaction.

55.7 ml of HC(OC$_2$H$_5$)$_3$ were added dropwise over 1 hour to the above reaction liquid which was maintained at 25° C. After completion of the adding, reaction was allowed to proceed at 60° C. for 15 minutes. The solid reaction product thus obtained was washed with each 300 ml of n-hexane six times, and dried at room temperature for 1 hour in vacuum to recover 31.6 g of a magnesium-containing solid which contained 19.0% of magnesium and 28.9% of chlorine.

In a 300 ml reactor equipped with a reflux condenser, a stirrer and a dropping funnel placed were 6.3 g of the magnesium-containing solid and 50 ml of n-heptane in a nitrogen atmosphere to prepare a suspension, to which a mixture solution of 20 ml of 2,2,2-trichloroethanol (0.02 m mole) and 11 ml of n-heptane was added dropwise from the dropping funnel at room temperature over 30 minutes under stirring, and then the stirring was continued at 80° C. for further 1 hour. The resultant solid was filtered and washed with each 100 ml of n-hexane of room temperature four times and, then, with each 100 ml of toluene twice to obtain a solid component.

To the above solid component added were 40 ml of toluene and, then, titanium tetrachloride in an amount to attain a volume ratio of titanium tetrachloride to toluene of 3/2, and heated to 90° C., to which a mixture solution of 2 ml of di-n-butyl phthalate and 5 ml of toluene was added dropwise over 5 minutes under stirring and, then, stirred at 120° C. for 2 hours. The resulting solid substance was filtered at 90° C. and washed with each 100 ml of toluene twice at 90° C., to which titanium tetrachloride in an amount to attain a volume ratio of titanium tetrachloride to the toluene (remaining after decantation in the final washing) of 3/2 was added and stirred at 120° C. for 2 hours. The resulting solid substance was filtered at 110° C. and washed with each 100 ml of n-hexane of room temperature seven times to obtain 5.5 g of solid component A.

(b) Pre-polymerization

In a 500 ml reactor purged with nitrogen gas and fully dried placed were 4.0 g of the component A obtained above and 200 ml of n-hexane in a nitrogen atmosphere, which were then cooled to -5° C. under stirring. Subsequently, 20 m moles of triethylaluminium and 2 m moles of isopropoxycyclopentyldimethoxysilane were added and stirred for 5 minutes. The system was decompressed and, then, a propylene gas was fed continuously to polymerize propylene at 0° C. for 1 hour. After the polymerization, the solid component was washed with each 200 ml of n-hexane three times at room temperature. The solid component was dried in vacuum at room temperature for 1 hour to obtain 16.2 g of a catalytic component. The amount of the prepolymerized propylene was 3.05 g per gram of component A.

(c) Polymerization of Propylene

Forty mg of the aforesaid catalytic component, 0.4 m mole of triethylaluminium, 0.08 m mole of diisopropoxymethoxy n-propylsilane and 7 ml of n-heptane were mixed and maintained for 5 minutes in a nitrogen atmosphere and placed in a 1.5 liters autoclave made of stainless steel equip with a stirrer. Then, 2 liters (normal temperature and pressure) of hydrogen as a molecular weight regulator and 1 liter of liquid propylene were fed under pressure. Subsequently, the reaction system was heated to 70° C. and polymerization of propylene was conducted for 1 hour. After the polymerization, unreacted propylene and hydrogen were purged, and a polymer was taken out and dried.

The resultant polymer had a total weight of 232 g, MFR of 30.3 g/10 minutes, HI of 95.6% and Mw/Mn of 5.8.

Examples 2 to 7

The procedures of Example 1 were repeated to polymerize propylene aiming at an MFR of about 30 g/10 minutes, but using the organic silicon compounds shown in Table 1 instead of isopropoxycyclopentyldimethoxysilane and diisopropoxymethoxy n-propylsilane used in Example 1. The results are as shown in Table 1.

Comparative Examples 1 to 4

The procedures of Example 1 were repeated to polymerize propylene with the exception that the organic silicon compounds shown in Table 1 were used.

TABLE 1

| | Alkyltrialkoxysilane in Prepolymerization | Alkyltrialkoxysilane in Polymerization | Hydrogen, ml | Activity, kg/g of component A | MFR, g/10 min. | HI, % | Mw/Mn |
|---|---|---|---|---|---|---|---|
| Ex. | | | | | | | |
| 1 | Isopropoxycyclopentyl dimethoxysilane | Diisopropoxymethoxy n-propylsilane | 2000 | 23.5 | 30.3 | 95.6 | 5.8 |
| 2 | Isopropoxycyclopentyl dimethoxysilane | Di-s-butoxymethoxy n-propylsilane | 2100 | 24.3 | 31.6 | 95.8 | 5.9 |
| 3 | Isopropoxycyclopentyl dimethoxysilane | Di-t-butoxymethoxy n-propylsilane | 2100 | 22.7 | 29.8 | 94.9 | 6.0 |
| 4 | t-Butoxycyclopentyl dimethoxysilane | Diisopropoxymethoxy n-propylsilane | 1950 | 22.6 | 31.5 | 95.2 | 5.9 |
| 5 | t-Butoxycyclopentyl dimethoxysilane | Di-s-butoxymethoxy n-propylsilane | 2200 | 23.2 | 28.9 | 95.8 | 6.0 |
| 6 | t-Butoxycyclopentyl dimethoxysilane | Di-t-butoxymethoxy n-propylsilane | 2100 | 21.3 | 29.6 | 96.0 | 5.8 |
| 7 | s-Butoxyisopropyl dimethoxysilane | Di-s-butoxymethoxy n-butylsilane | 1900 | 22.6 | 28.6 | 95.7 | 5.9 |
| Comp. Ex. | | | | | | | |
| 1 | Isopropoxycyclopentyl dimethoxysilane | Triethoxy n-propylsilane | 2000 | 18.6 | 33.5 | 94.8 | 4.1 |
| 2 | Isopropoxycyclopentyl dimethoxysilane | Cyclohexylmethyl dimethoxysilane | 2000 | 27.8 | 20.3 | 94.6 | 4.5 |

TABLE 1-continued

|   | Alkyltrialkoxysilane in Prepolymerization | Alkyltrialkoxysilane in Polymerization | Hydrogen, ml | Activity, kg/g of component A | MFR, g/10 min. | HI, % | Mw/Mn |
|---|---|---|---|---|---|---|---|
| 3 | Isopropoxycyclopentyl dimethoxysilane | Isopropoxycyclopentyl dimethoxysilane | 4500 | 28.3 | 29.2 | 96.3 | 6.2 |
| 4 | Diisopropoxymethoxy n-propylsilane | Diisopropoxymethoxy n-propylsilane | 1300 | 29.6 | 20.0 | 94.3 | 5.9 |

Random Copolymerization of Propylene and Ethylene

Example 8

The steps (a) and (b) in Example 1 were repeated to obtain a solid catalytic component.

(c) Random Copolymerization of Propylene and Ethylene

A hundred thirty mg of the aforesaid catalytic component, 1.2 m moles of triethylaluminium, 0.24 m mole of diisopropoxymethoxy n-propylsilane and 7 ml of n-heptane were mixed and maintained for 5 minutes in a nitrogen atmosphere and placed in a 5 liters stainless steel autoclave purged with nitrogen and fully dried. Then, 4.0 liters (normal temperature and pressure) of hydrogen as a molecular weight regulator, 3 liters of liquid propylene and 12 g of ethylene were fed under pressure. Subsequently, the temperature in the autoclave was raised to 70° C. and ethylene was fed continuously at a rate of 0.5 g/minute.

One hour after, unreacted propylene and ethylene, and hydrogen were purged, and a copolymer was taken out and dried.

The resultant copolymer had a total weight of 810 g, MFR of 10.5 g/10 minutes, ES of 0.9%, ethylene content of 3.1% by weight, and Mw/Mn of 5.9.

Examples 9 and 10

The procedure of Example 8 were repeated to copolymerize propylene and ethylene, but using di-sec.-butoxymethoxy n-propylsilane or di-tert.-butoxymethoxy n-propylsilane, respectively, instead of diisopropoxymethoxy n-propylsilane in step (c). The amounts of hydrogen was regulated to attain an MFR of about 10 g/10 minutes, and the amount of ethylene was regulated to attain an ethylene content of about 3% in the resultant copolymers. The results are as shown in Table 2.

Example 11

The procedure of Example 8 were repeated with the exception that tert.-butoxycyclopentyldimethoxysilane was used instead of isopropoxycyclopentyldimethoxysilane in step (b) in the prepolymerization to obtain a catalytic component. The amounts of hydrogen was regulated to attain an MFR of about 10 g/10 minutes, and the amount of ethylene was regulated to attain an ethylene content of about 3% in the resultant copolymers. The results are as shown in Table 2.

Examples 12 and 13

The procedure of Example 11 were repeated to copolymerize propylene and ethylene, but using di-sec.-butoxymethoxy n-propylsilane or di-tert.-butoxymethoxy n-propylsilane, respectively, instead of diisopropoxymethoxy n-propylsilane in step (c). The amounts of hydrogen was regulated to attain an MFR of about 10 g/10 minutes, and the amount of ethylene was regulated to attain an ethylene content of about 3% in the resultant copolymers. The results are as shown in Table 2.

Comparative Examples 5 to 7

The procedure of Example 8 were repeated to copolymerize propylene and ethylene, but using triethoxy n-propylsilane, cyclohexymethyldimethoxysilane or isopropoxycyclopentyldimethoxysilane, respectively, instead of diisopropoxymethoxy n-propylsilane in step (c). The amounts of hydrogen was regulated to attain an MFR of about 10 g/10 minutes, and the amount of ethylene was regulated to attain an ethylene content of about 3% in the resultant copolymers. The results are as shown in Table 2.

Comparative Example 8

The procedure of Example 8 were repeated with the exception that diisopropoxymethoxy n-propylsilane was used instead of isopropoxycyclopentyldimethoxysilane in step (b) for the prepolymerization to obtain a catalytic component. The amounts of hydrogen was regulated to attain an MFR of about 10 g/10 minutes, and the amount of ethylene was regulated to attain an ethylene content of about 3% in the resultant copolymers. The results are as shown in Table 2.

TABLE 2

| | Alkyltrialkoxysilane in Prepolymerization | Alkyltrialkoxysilane in Polymerization | Hydrogen, ml | Activity, kg/g of component A | Ethylene Content, wt. % | ES, wt. % | MFR, g/10 min. | Mw/Mn |
|---|---|---|---|---|---|---|---|---|
| Ex. | | | | | | | | |
| 8 | Isopropoxycyclopentyl dimethoxysilane | Diisopropoxymethoxy n-propylsilane | 2500 | 25.2 | 3.1 | 0.9 | 10.5 | 5.9 |
| 9 | Isopropoxycyclopentyl dimethoxysilane | Di-s-butoxymethoxy n-propylsilane | 2400 | 23.5 | 2.8 | 0.9 | 10.1 | 6.0 |
| 10 | Isopropoxycyclopentyl dimethoxysilane | Di-t-butoxymethoxy n-propylsilane | 2340 | 23.0 | 3.3 | 0.8 | 10.3 | 5.9 |
| 11 | t-Butoxycyclopentyl dimethoxysilane | Diisopropoxymethoxy n-propylsilane | 2500 | 24.5 | 3.2 | 0.9 | 10.3 | 6.0 |

TABLE 2-continued

| | Alkyltrialkoxysilane in Prepolymerization | Alkyltrialkoxysilane in Polymerization | Hydrogen, ml | Activity, kg/g of component A | Ethylene Content, wt. % | ES, wt. % | MFR, g/10 min. | Mw/Mn |
|---|---|---|---|---|---|---|---|---|
| 12 | t-Butoxycyclopentyl dimethoxysilane | Di-s-butoxymethoxy n-propylsilane | 2400 | 24.0 | 3.0 | 1.0 | 10.5 | 5.8 |
| 13 | t-Butoxycyclopentyl dimethoxysilane | Di-t-butoxymethoxy n-propylsilane | 2340 | 23.0 | 3.4 | 1.0 | 9.9 | 5.8 |
| Comp. Ex. | | | | | | | | |
| 5 | Isopropoxycyclopentyl dimethoxysilane | Triethoxy n-propylsilane | 2000 | 19.6 | 2.7 | 1.2 | 9.5 | 4.2 |
| 6 | Isopropoxycyclopentyl dimethoxysilane | Cyclohexylmethyl dimethoxysilane | 3000 | 31.2 | 2.8 | 1.5 | 11.2 | 4.8 |
| 7 | Isopropoxycyclopentyl dimethoxysilane | Isopropoxycyclopentyl dimethoxysilane | 6000 | 33.6 | 3.0 | 2.3 | 8.8 | 6.1 |
| 8 | Diisopropoxymethoxy n-propylsilane | Diisopropoxymethoxy n-propylsilane | 1350 | 21.6 | 3.1 | 1.6 | 8.8 | 5.9 |

Block Copolymerization of Propylene and Ethylene

Example 14

The step (a) in Example 1 was repeated to obtain component A of 5.5 g.

(b) Pre-polymerization

In a 200 ml reactor purged with nitrogen gas and fully dried placed were 2.5 g of the component A obtained above and 100 ml of n-hexane, which was then cooled to 0° C. under stirring. Subsequently, 10 m moles of triethylaluminium and 1 m mole of isopropoxycyclopentyldimethoxysilane were added and stirred for 10 minutes at the same temperature. Then, a propylene gas was fed continuously. When the amount of consumed propylene reached 7.5 g, the feed of propylene was stopped. After the prepolymerization, the solid catalytic component was washed by decantation with each 80 ml of hexane five times to obtain a slurry of the solid catalytic component.

(c) Block Copolymerization

Forty one mg of the solid catalytic component thus obtained, 1 ml of a solution of triethylaluminium in n-heptane (0.4 mole/liter) and 1 ml of a solution of diisopropoxymethoxy n-propylsilane in n-heptane (0.08 mole/liter) were mixed and maintained for 5 minutes and placed in a 1.5 liters autoclave.

Then, 3 liters of hydrogen as a molecular weight regulator and 1 liter of liquid propylene were fed under pressure. Subsequently, the content in the autoclave was heated to 70° C. and polymerization for step (1) was conducted for 1 hour. After the polymerization, unreacted propylene and hydrogen were purged, and the pressure in the autoclave was made to 0.2 Kgf/cm$^2$G. A small amount of a polymer sample from step (1) was taken out and, then, hydrogen was introduced into the system. Subsequently, a gas mixture of propylene and ethylene at a mole ratio of 1.5 was fed to copolymerize propylene and ethylene, where the pressure in the reactor was kept at 6 Kgf/cm$^2$G and the copolymerization was conducted at 75° C. for 2 hours. After the polymerization, unreacted gas was purged and the polymer was taken out. The unreacted gas contained 0.3% of hydrogen.

The resultant final polymer had an MFR of 22 g/10 minutes. Accordingly to analysis, the ratio of the polymer obtained by copolymerization was 20% by weight, and the ethylene content was 50% by weight. The sample polymer taken out after step (1) had an MFR of 83 g/10 minutes. The final polymer showed a bending modulus of 8.5×10$^3$ Kgf/cm$^2$ and a Du Pont impact strength of 90.5 Kgf·cm.

Examples 15 to 20 and Comparative Examples 9 to 12

The procedures of Example 14 were repeated to copolymerize propylene and ethylene, but regulating the amount of hydrogen to attain an MFR of about 20 g/10 minutes, and using the organic silicon compounds shown in Table 3 instead of isopropoxycyclopentyldimethoxysilane and diisopropoxymethoxy n-propysilane used in Example 14. The results are shown in Table 3.

In Comparison Examples 10 and 11, the MFRs are rather low for the following reason. The catalysts used there have a poor hydrogen response. Therefore, a higher amount of hydrogen than in the other cases was needed to attain a lower MFR around 20 g/10 minutes, but this was impossible because a higher withstanding pressure of the autoclave would be needed.

TABLE 3

| | | | Propylene Polymerization | | Pro-Eth Copolymerization Ethylene | | Final Polymer | Elastic | Du Pont Impact |
|---|---|---|---|---|---|---|---|---|---|
| | Alkyltrialkoxysilane in Prepolymerization | Alkyltrialkoxysilane in Polymerization | MFR, g/10 min | Yield, % | Cont., % | Ratio % | MFR, g/10 min. | Modulus, 10$^3$ Kgf/cm$^2$ | Strength, Kgf·cm |
| Ex. | | | | | | | | | |
| 14 | Isopropoxycyclopentyl dimethoxysilane | Diisopropoxymethoxy n-propylsilane | 83 | 80 | 50 | 20 | 22 | 8.50 | 90.5 |
| 15 | Isopropoxycyclopentyl dimethoxysilane | Di-s-butoxymethoxy n-propylsilane | 79 | 81 | 49 | 19 | 20 | 8.25 | 94.5 |
| 16 | Isopropoxycyclopentyl | Di-t-butoxymethoxy | 76 | 78 | 50 | 22 | 19 | 8.60 | 88.6 |

TABLE 3-continued

| | Alkyltrialkoxysilane in Prepolymerization | Alkyltrialkoxysilane in Polymerization | Propylene Polymerization | | Pro-Eth Copolymerization Ethylene | | Final Polymer | | Elastic | Du Pont Impact |
|---|---|---|---|---|---|---|---|---|---|---|
| | | | MFR, g/10 min | Yield, % | Cont., % | Ratio, % | MFR, g/10 min. | | Modulus, $10^3$ Kgf/cm$^2$ | Strength, Kgf · cm |
| 17 | t-Butoxycyclopentyl dimethoxysilane | Diisopropoxymethoxy n-propylsilane | 85 | 80 | 51 | 20 | 19 | | 8.40 | 92.2 |
| 18 | t-Butoxycyclopentyl dimethoxysilane | Di-s-butoxymethoxy n-propylsilane | 77 | 79 | 48 | 21 | 21 | | 8.20 | 95.4 |
| 19 | t-Butoxycyclopentyl dimethoxysilane | Di-t-butoxymethoxy n-propylsilane | 77 | 81 | 50 | 19 | 22 | | 8.32 | 90.2 |
| 20 | s-Butoxyisopropyl dimethoxysilane | Di-s-butoxymethoxy n-butylsilane | 88 | 83 | 52 | 17 | 22 | | 7.78 | 112.3 |
| Comp. Ex. | | | | | | | | | | |
| 9 | Isopropoxycyclopentyl dimethoxysilane | Triethoxy n-propylsilane | 85 | 80 | 50 | 20 | 22 | 4.1 | 8.23 | 83.2 |
| 10 | Isopropoxycyclopentyl dimethoxysilane | Cyclopentylmethyl dimethoxysilane | 53 | 79 | 51 | 21 | 15 | 4.5 | 7.62 | 100.7 |
| 11 | Isopropoxycyclopentyl dimethoxysilane | Isopropoxycyclopentyl dimethoxysilane | 52 | 80 | 50 | 20 | 13 | 2 | 7.88 | 90.3 |
| 12 | Diisopropoxymethoxy n-propylsilane | Diisopropoxymethoxy n-propylsilane | 87 | 82 | 51 | 18 | 24 | 5.9 | 8.25 | 80.3 |

We claim:

1. A catalyst for the polymerization of olfines, comprising a solid catalytic component obtained by prepolymerizing propylene in the presence of (A) a solid component containing magnesium, titanium, halogen and an electron-donating compound, (B) an organoaluminum compound, and (C) an alkylalkoxysilane, characterized in that the catalyst comprises a solid catalytic component obtained by prepolymerizing propylene in the presence of (A) said solid component, (B) an organoaluminum compound, and (C) an alkyltrialkoxysilane represented by the formula,

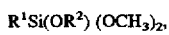

$R^1Si(OR^2)(OCH_3)_2$, wherein $R^1$ represents a branched or cyclic alkyl group having 3 to 6 carbon atoms, and $R^2$ represents a branched alkyl, alkenyl or alkynyl group having 3 to 6 carbon atoms;

(B) an organoaluminum compound; and (D) an alkyltrialkoxysilane represented by the formula,

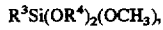

$R^3Si(OR^4)_2(OCH_3)$, wherein $R^3$ represents a linear alkyl group having 3 to 6 carbon atoms, and $R^4$ represents a branched alkyl, alkenyl or alkynyl group having 3 to 5 carbon atoms.

2. A process for the polymerization of propylene, characterized in that propylene is polymerized in the presence of the catalyst claimed in claim 1.

3. A process for the random copolymerization of propylene and ethylene to produce a random copolymer having an ethylene content of 0.1 to 6% by weight, characterized in that propylene and ethylene are copolymerized in the presence of the catalyst claimed in claim 1.

4. A process for the block copolymerization of propylene and ethylene to produce a block copolymer of propylene and ethylene, comprising the following steps in any order:

(1) propylene alone is polymerized to produce a highly crystalline polypropylene, and (2) propylene and ethylene are copolymerized, characterized in that steps (1) and (2) are conducted in the presence of the catalyst claimed in claim 1.

5. The catalyst as claimed in claim 1, wherein magnesium is originated from a magnesium compound represented by the general formula, $MgR^5R^6$, wherein $R^5$ and $R^6$ may be same with or different from each other and represent a hydrocarbon group having 1 to 20 carbon atoms, an OR' group (wherein R' is a hydrocarbon group having 1 to 12 carbon atoms) or a halogen atom; titanium is originated from a compound of Ti(II), Ti(III) or Ti(IV); and the electron-donating compound is selected from the group consisting of carboxylic acids, carboxylic acid anhydrides, carboxylic acid esters, carboxylic acid halides, alcohols and ethers.

6. The catalyst as claimed in claim 1, wherein organoaluminum compound (B) is selected from the group consisting of trialkylaluminium, dialkylaluminium monohalide, monoalkylaluminium dihalide, alkylaluminium sesquihalide, dialkylaluminium monoalkoxide and dialkylaluminium monohalide, and mixtures or complexes thereof, wherein the alkyl group has 1 to 18 carbon atoms.

7. The catalyst as claimed in claim 1, wherein $R^1$ is a branched or cyclic alkyl group having 3 to 5 carbon atoms, and $R^2$ is a branched alkyl group having 3 to 5 carbon atoms.

8. The catalyst as claimed in claim 1, wherein $R^1$ is an isopropyl group or a cyclpentyl group, and $R^2$ is an isopropyl group, a sec.-butyl group or a tert.-butyl group.

9. The catalyst as claimed in claim 1, wherein $R^3$ is a linear alkyl group having 3 to 5 carbon atoms, and $R^4$ is a branched alkyl group having 3 to 5 carbon atoms.

10. The catalyst as claimed in claim 1, wherein $R^3$ is a propyl group or a butyl group, and $R^4$ is an isopropyl group, sec.-butyl group or a tert.-butyl group.

11. The catalyst as claimed in claim 1, wherein titanium is di- or tetravalent titanium, the electron-donating compound is a carboxylic acid or a derivative thereof; (B) the organoaluminum compound is represented by the general formula, $R_nAlX_{3-n}$, wherein R represents an alkyl or aryl group having 1 to 18 carbon atoms and X represents a halogen atom, an alkoxy group or a hydrogen atom and n is any number in the range $1 \leq n \leq 3$; (C) the alkyltrialkoxysilane is represented by the general formula, $R^1Si(OR^2)(OCH_3)_2$, wherein $R^1$ represents an isopropyl group or a cyclopentyl group, and $R^2$ represents an isopropyl group, sec.-butyl group or a tert.-butyl group; and (D) the alkyltrialkoxysilane is represented by the general formula, $R^3Si(OR^4)_2(OCH_3)$, wherein $R^3$ represents a propyl group or a butyl group, and $R^4$ represents an isopropyl group, a sec.-butyl group or a tert.-butyl group.

12. The process as claimed in any one of claims 2, 3 and 4, wherein the catalyst is prepared from the following amounts of the components:

the solid catalytic component prepared from 0.1 to 500 g/liter of component (A), 10 to 500 m moles/liter of component (B) and 1 to 1,000 m moles/liter of component (C) in the prepolymerization, wherein "liter" is a volume of a prepolymerization reaction system, and component (B) and component (D) at a ratio of 0.1 to 40 gram atoms of aluminium contained in component (B) per mole of component (D) in the polymerization or copolymerization.

13. The process as claimed in any one of claims 2, 3 and 4, wherein the catalyst comprises the following amount of the components:

the solid catalytic component prepared from 5 to 100 g/liter of component (A), 30 to 200 m moles/liter of component (B) and 2 to 200 m moles/liter of component (C) in the prepolymerization, wherein "liter" is a volume of a prepolymerization reaction system, and component (B) and component (D) at a ratio of 1 to 25 gram atoms of aluminium contained in component (B) per mole of component (D) in the polymerization or copolymerization.

14. A catalyst for the polymerization of olfines, comprising:

a solid catalytic component obtained by prepolymerizing propylene in the presence of (A) a solid component containing magnesium, titanium, halogen and an electron-donating compound, (B) an organoaluminum compound of the formula, $$R_nAl\, X_{3-n} \qquad (I),$$

wherein R represents an alkyl or aryl group having 1 to 18 carbon atoms, X represents a halogen atom and n is any number in the range $1 \leq n \leq 3$, and (C) an alkyltrialkoxysilane represented by the formula, $$R^1Si(OR^2)\,(OCH_3)_2 \qquad (I),$$

wherein $R^1$ represents a branched or cyclic alkyl group having 3 to 6 carbon atoms, and $R^2$ represents a branched alkyl, alkenyl or alkynyl group having 3 to 6 carbon atoms;

(B) an organoaluminum compound of said formula (II); and (D) an alkyltrialkoxysilane represented by the formula, $$R^3Si(OR^4)_2(OCH_3) \qquad (III),$$

wherein $R^3$ represents a linear alkyl group having 3 to 6 carbon atoms, and $R^4$ represents a branched alkyl, alkenyl or alkynyl group having 3 to 5 carbon atoms.

* * * * *